Jan. 22, 1963  A. H. EBERMAN  3,074,106
EXTRUDER DIE
Filed Dec. 11, 1958  3 Sheets-Sheet 1
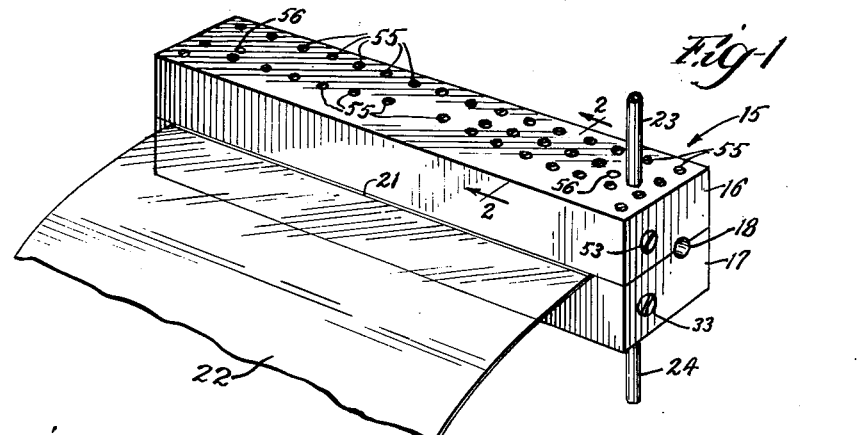
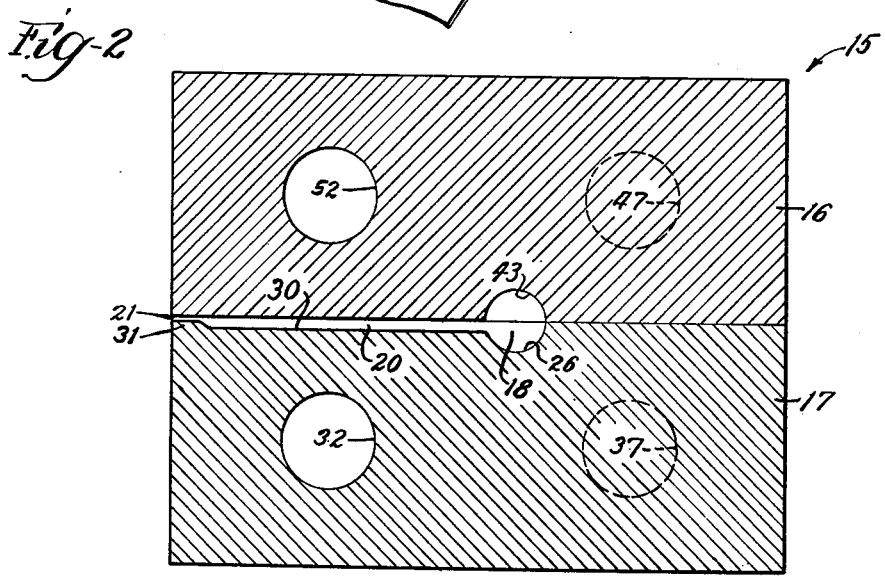
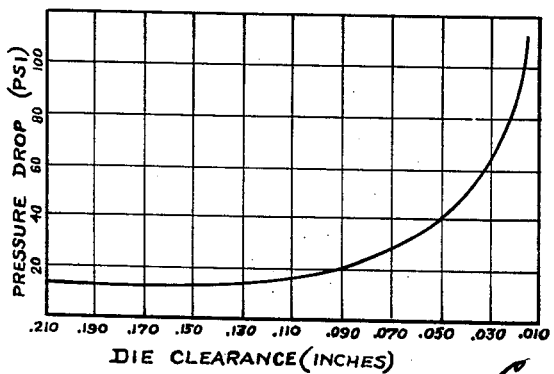
INVENTOR.
Augustus H. Eberman
BY
Cromwell, Greist & Warden
Attys.

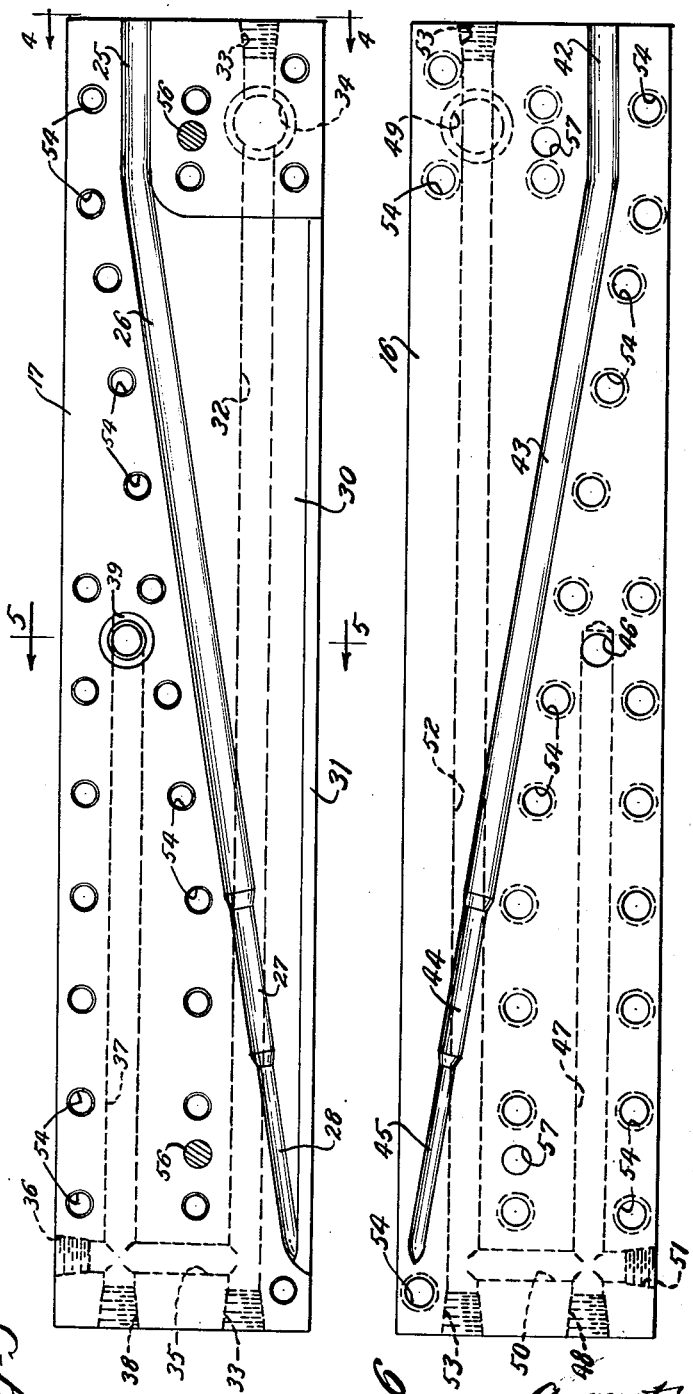

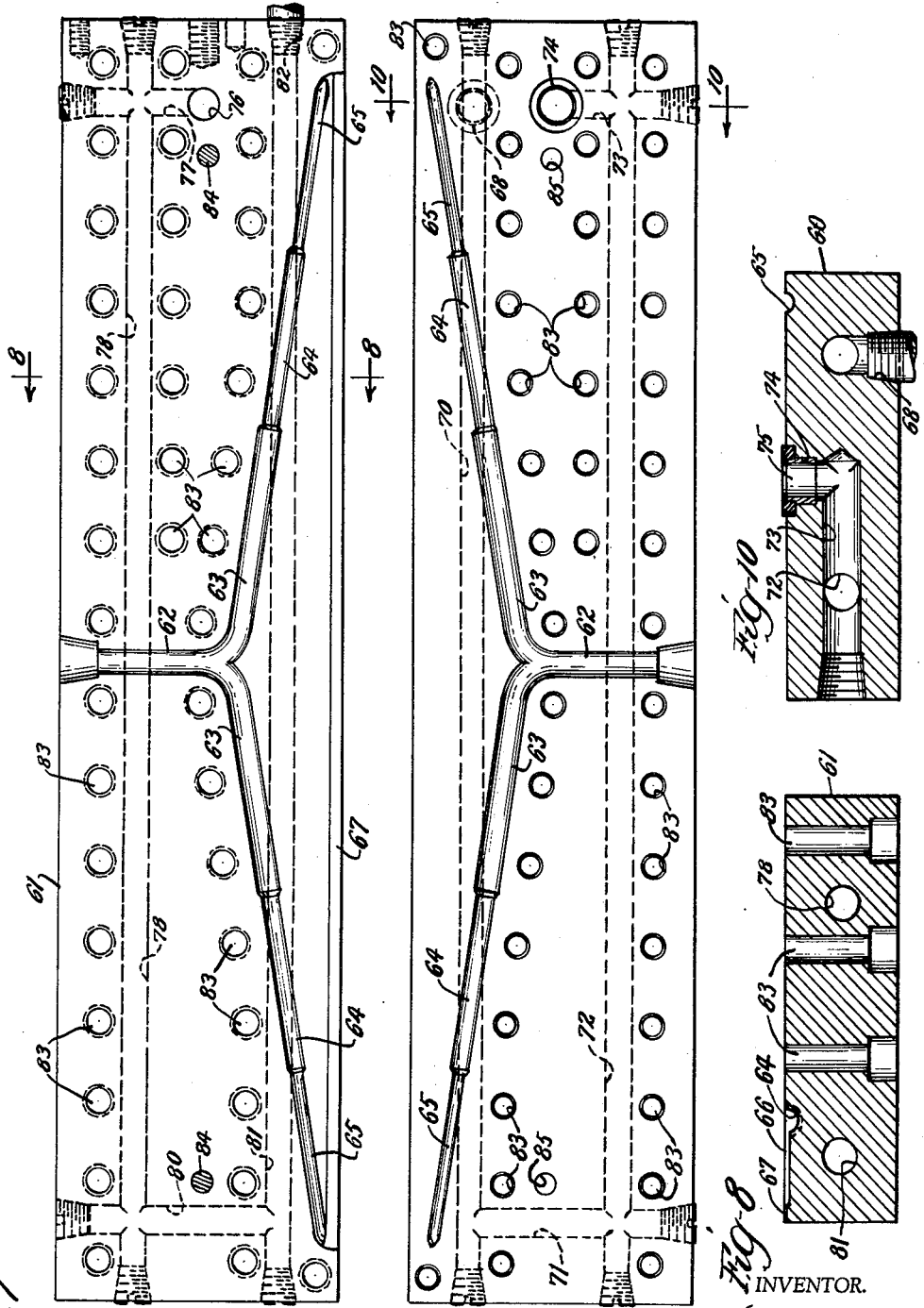

United States Patent Office

3,074,106
Patented Jan. 22, 1963

3,074,106
EXTRUDER DIE
Augustus H. Eberman, Madison, Wis., assignor to Oscar Mayer and Co., Inc., Chicago, Ill., a corporation of Illinois
Filed Dec. 11, 1958, Ser. No. 779,648
5 Claims. (Cl. 18—12)

The present invention relates to a new and improved extruder die for use in forming a continuous sheet of film from thermoplastic material, particularly a material which is heat-sensitive and subject to decomposition and/or modification during the forming of film therefrom under elevated temperature, plastic-flow conditions.

Extruder dies of known type used in forming a continuous film in sheet form from thermoplastic polymeric material generally operate to continuously deliver the material in a molten state into a radially confined passageway in a die from the side of which the material spreads into a sheet forming area which extends laterally of the material delivery passageway and into communication with a face of the die from which the sheet of film is extruded. The extruder feed to the material delivery passageway is generally located centrally of the die and sheet forming slot-like area, and the molten material must spread laterally in opposite directions from the passageway throughout the entire slot-like area to form a sheet of predetermined width. The molten material under delivery pressure will tend to follow the shortest path through the sheet forming area which is generally in axial alignment with the material delivery passageway. Consequently, to produce a sheet of uniform thickness, the molten material must be made to flow laterally at a rate which is related to the time through the sheet forming slot area at the center of the die. This spreading is accomplished by the use of manually deformed spreader bars and/or die lips. This usually is accomplished by the use of push-pull screws cooperating with the spreader bars and/or die lips and results in the sheet forming slot areas having the least clearance at the center of the die and becoming progressively greater towards the ends. Initially these adjustments must be made with the extruder in operation and by turning the adjusting screws in and out along the die length until the extruder sheet has the desired uniformity.

On re-assembly after cleaning, these adjustments generally can be roughly pre-set but usually require further adjusting under operating conditions. Further, because the material delivery passageway is generally of uniform diameter and therefore has uniform volume throughout its length, it becomes obvious that portions of the molten material in the passageway will progressively have greater retention times towards the ends of the die. Under these conditions the material used will be subject to heat damage and/or modification as a result of lateral spreading retention in the die during which retention such material is subjected to die temperatures for a longer period of time, these temperatures being predetermined for maintenance of efficient plastic-flow and extrusion conditions in a given material.

Die operating conditions of the type outlined prevent efficient utilization of heat-sensitive thermoplastic materials, such as polyvinylidene chloride, as non-uniform flow of the materials through the material delivery passageway and sheet forming area results in either a material reduction in rate of flow of portions of the material or actual stagnation thereof to a degree that at least partial chemical or physical modification as well as possible decomposition of the material occurs as a result of overheating. Decomposition to any appreciable degree within the sheet forming area results in the formation of deposits of the decomposed material to the detriment of die operating efficiency. Following a relatively short period of operation, it is necessary to dismantle the die and clean the same in order to restore its efficiency. Even where the material used is not particularly heat-sensitive, initial operation of a die of the type described results in the formation of a non-uniform and generally unusable film until the film forming area is finally adjusted and continuously supplies material uniformly throughout its entirety. Furthermore, in order to adequately laterally spread the material throughout the sheet forming area, a relatively high back pressure must be overcome.

It is an object of the present invention to provide a new and improved extruder die for use in forming a continuous film of thermoplastic material, the die being particularly adapted for use in forming films from materials which are at least partially susceptible to heat decomposition as a result of non-uniform flow.

Additional objects in the form of separate advantages accompanying the use of the extruder die of the present invention are as follows:

(1) Design simplicity, compactness and relatively small mass.
(2) Minimum die material and machining.
(3) Ease of assembly, disassembly and cleaning.
(4) Minimized volumetric delivery of film forming material and minimized back pressure.
(5) Readily adaptable to end or center feeding.
(6) Minimum leakage problem due to single joint surface.
(7) No manual adjustments required.
(8) Predictable performance with different types of thermoplastic materials.
(9) Rapid heating and/or cooling.
(10) Reduced stagnant portions of thermoplastic material as well as pockets or crevices encouraging stagnation.

Other objects not specifically set forth will become apparent from the following detailed description made in conjunction with the drawings wherein:

FIG. 1 is a perspective view of one form of extruder die of the present invention;

FIG. 2 is an enlarged vertical section of the die of FIG. 1 taken generally along line 2—2 therein;

FIG. 3 is a top plan view of the bottom die plate of the assembled die of FIG. 1;

FIG. 4 is an end elevation of the bottom die plate of FIG. 3 as viewed from the right therein;

FIG. 5 is a vertical section of the bottom die plate of FIG. 3 taken generally along line 5—5 therein;

FIG. 6 is a bottom plan view of the top die plate of the assembled extruder die of FIG. 1;

FIG. 7 is a top plan view of a bottom die plate of a modified extruder die incorporating therein the principles of the present invention;

FIG. 8 is a vertical section of the bottom die plate of FIG. 7 taken generally along line 8—8 therein;

FIG. 9 is a bottom plan view of a top die plate designed for use with the die plate of FIG. 7;

FIG. 10 is a vertical section of the top die plate of FIG. 9 taken generally along line 10—10 therein; and FIG. 11 is a plastic flow pressure graph to determine die clearance when using polyvinylidene chloride material.

To generally describe the structural features and operational concept of the extruder die of the present invention for forming the continuous uniform film constituting a part of the invention, reference is made to FIGS. 1 and 2. A two-plate extruder die 15 is illustrated as comprising interconnected top and bottom die plates 16 and 17, respectively. The combined surfaces of the plates 16 and 17 define therebetween an internal sheet forming, material delivery passageway 18 which is in communication with one end face of the assembled die as shown in FIG. 1 for connection to suitable conduit means through which molten film forming material is introduced into the die. Referring to FIG. 2, the passageway 18 longitudinally thereof is in communication with a radially extending sheet forming area which is in the form of a slot 20 defined btween the combined surfaces of the die plates 16 and 17. The slot 20 extends from the passageway 18 to the front face of the die, and for use in film thickness control, an orifice or die gap 21 of reduced clearance may be provided along the extrusion face of the die.

Referring again to FIG. 1, molten sheet forming material is delivered into the passageway 18, spread radially therefrom into the slot 20, and extruded through the die gap 21 to form a continous sheet of film 22 delivered from the face of the die 15. To maintain the film forming material in molten condition within the die 15, the top plate 16 carries internal passageways for heating fluid circulation, the fluid being delivered thereinto through a conduit means 23. The heating fluid, as will be specifically described, flows from the top plate 16 into internal passageways in the bottom plate 17 and is removed from the die through conduit means 24 received in the bottom plate 17.

FIGS. 3–5 illustrate the structural details of the bottom die plate 17. The top face of the plate 17 has machined therein a channel-like groove 25 which extends from an end face of the plate and into communication with a groove 26 which extends at an angle across the face of the plate 17. The groove 26 is continued by groove portions 27 and 28 which are of progressively reduced radii with the extreme end of the groove portion 28 terminating just short of the opposite end face of the plate 17. The groove portions 26–28 are in radial communication throughout the entire longitudinal extension thereof with a recessed area 30 of generally triangular outline which, as will be more specifically described, defines the sheet forming slot 20 illustrated in FIG. 2. The recessed area 30 communicates with the front face of the plate 17 and along its terminus at this face a continuous land 31 is provided to define the die gap 21 illustrated in FIG. 2.

Interiorly of the die plate 17 toward the front face thereof is a fluid circulating passageway 32 extending longitudinally of the plate. In forming this passageway the same is drilled throughout the entire length of the plate and the opposite ends thereof are closed off by plugs 33. Inwardly of the plug 33 adjacent to the right-hand end face of the plate as viewed in FIG. 3, a vertically directed tapped opening 34 is formed in the plate 17 extending from the bottom face thereof into communication with the passageway 32 at right angles thereto. The opening 34 is designed for receiving therein the heating fluid conduit 24 shown in FIG. 1.

Near the opposite end of the passageway 32 inwardly of the left-hand end face of the plate 17 is viewed in FIG. 3 is a transverse internal passageway 35 which is formed by drilling through the rear face of the plate 17 and which communicates with the passageway 32. The rear face opening of the passageway 35 is closed off by a plug 36 and inwardly of the plug 36 the passageway is in communication with a longitudinal internal passageway 37 which is drilled through the left-hand end face of the plate 17 as viewed in FIG. 3 with its end face opening being sealed by a plug 38.

The innermost end of the passageway 37 is in communication with a vertically directed countersunk opening 39 which is shown in detail in FIG. 5. This opening extends upwardly through the top of the die plate 17 and has received therein a sealing collar 40 having a portion thereof which projects upwardly out of the opening 39 and slightly below the top face of the die plate 17. A sealing gasket 41 is placed in the annular recess comprising the countersink.

FIG. 6 illustrates the structural details of the top die plate which includes a channel-shaped groove portion 42 extending from communication with the right-hand end face of the plate 16 as viewed in FIG. 6 and into communication with an angled channel-shaped groove portion 43 which extends a substantial distance across the face of the die plate 16. Groove portions 44 and 45 of progressively reduced radii constitute extensions of the groove portions 43. The groove portions described constitute the only groove or slotted areas of the bottom face of the die plate 16 and are arranged to overlie the groove portions 25–28 of the bottom die plate 17 when the top die plate 16 is inverted from the position shown in FIG. 6 and placed on top of the bottom die plate 17 as illustrated in FIGS. 1 and 2.

In combining the die plates 16 and 17 as described, an extruder die assembly is formed which in the mated surfaces thereof includes an angled internal material delivery passageway defined by the combined semi-circular groove portions 25–28 and 42–45 respectively. The internal material delivery passageway 18 throughout the inclined or angled length thereof is in communication with the relatively shallow recess area 30 of the bottom die plate 17, this area being enclosed by the adjacent flat surface area of the top die plate 16 to provide a laterally or transversely directed sheet-forming slot 20 previously described. The land 31 of the bottom die plate 17 restricts the outer terminus of the slot 20 to, in effect, form an extrusion orifice or die gap to control final film or sheet thickness.

Upon mating of the surfaces of the die plates 16 and 17 in the manner described, the projecting portion of the sealing gasket 41 is compressed about the opening of a passageway 46 extending vertically upwardly from the bottom face of the top die plate 16 as shown in FIG. 6. The passageway 46 is in communication with a longitudinally extending passageway 47 which is drilled internally in the top die plate 16 commencing from the left-hand end face thereof as viewed in FIG. 6 with the end thereof being sealed by a plug 48. An internal passageway 50 extends transversely of the die plate 16 commencing from the rear face thereof as viewed in FIG. 6 with this end being closed by a plug 51, intercepting the passageway 47 to be in communication therewith, and extending into communication with a longitudinally extending internal passageway 52. The opposite ends of the passageway 52 as viewed in FIG. 6 are closed by plugs 53. Inwardly of the right-hand plug 53 adjacent to the right-hand end face of the plate as viewed in FIG. 6, a vertically directed tapped opening 49 is formed in the plate 16 extending from the bottom face thereof into communication with the passageway 52 at right angles thereto. The opening 49 is designed for receiving therein conduit 23 shown in FIG. 1.

The internal passageways of the die plates 16 and 17 cooperate to circulate heating fluid throughout the assembled die to maintain the temperature of the die at a predetermined degree to retain molten fluidity in the sheet forming material during extrusion thereof. By way of illustration, the heating fluid may be delivered into the assembled die 15 through the conduit 23, circulate through the internal passageways of the top die plate 16, flow through the passageway 46 into the passageway 39 of the bottom die plate 17, flow through the interconnected passageways of the bottom die plate 17, and subsequently be removed from the assembled die through the discharge conduit 24.

For the purpose of assembling the extruder die 15 and clamping the die plates 16 and 17 in tight engagement, each of the die plates 16 and 17 is provided with a plurality of aligned, tapped vertical openings 54 through which threaded bolts 55 (see FIG. 1) are received. For the purpose of obtaining proper initial alignment during assembling of the die, the bottom die plate 17 is provided with a pair of vertically upwardly directed dowel pins 56 which are received in openings 57 formed in the top die plate 16.

In the extruder die of the present invention, the material delivery passageway 18 and the sheet forming slot 20 are angularly arranged and sized relative to one another to tend toward the obtaining of a constant and equal extrusion time rate of flow of the plastic material upon entry thereof into the passageway 18 and to any point along the terminus of the slot 20 as defined by the die gap 21. Not only does the rate of flow of the plastic material through the die tend towards being constant but the actual time during which any given portion of the plastic material is retained in the die is also substantially constant. These factors provide for improved efficiency in continuous sheet forming operation, improved uniformity in the extruded film, and reduced maintenance throughout extended periods of die operation.

In connection with the advantage of reduced maintenance, it will be noted that the extruder die 15 is of uncomplicated design while further being compact and of a relatively small mass. Fabrication of the die requires minimum material as well as minimum machining and drilling operations. The die is readily and easily assembled, disassembled and cleaned. As will be more specifically described, there is a minimum of internal volumetric area in the die through which the plastic material flows. Consequently, with internal volume being held at a minimum, there is a relatively low operational time retention of molten material. Leakage is minimized due to the use of only two joined surfaces and no manual adjustment of the die plates is necessary following combining thereof. The particular arrangement of the flow channels and areas eliminates pockets or crevices in which plastic material can collect and become stagnant. This latter feature is of particular importance in connection with the extrusion of heat-sensitive materials such as polyvinylidene chloride. The die will perform in a readily predictable manner and in view of the compactness of design and small material mass, rapid heating and/or cooling occurs.

The extruder die of the present invention is particularly adapted for use in extrusion of heat-sensitive plastic materials such as polyvinylidene chloride. Difficulties have been encountered in attempting to extrude sheets of polyvinylidene chloride using known types of extruder dies. The arrangement of the material delivery passageway and sheet forming slot in many known extruder dies is such that the time during which given quantities of the film forming material are retained in the die will consistently vary considerably. Furthermore, there are pockets or crevices present due to the multi-part make-up of many dies in which the plastic material will stagnate. Those portions of the plastic material either stagnated or retained in a die over an appreciable length of time are subjected to decomposition in their heated state. Decomposition of the plastic results in the formation of stationary deposits on the operative die surfaces and often in clogging of the die to an extent that disassembly and cleaning is necessary. Decomposition also contributes to non-uniformity in extruded sheet formation.

In considering the various factors affecting the flow of plastic material along die surfaces, the following must be taken into consideration.

| | |
|---|---|
| Surface finish | Constant |
| Polymer | |
| Temperature viscosity | Related constants |
| Skin friction | |
| Pressure | |
| Pressure drop | Variables |
| Die clearance | |

As indicated in the right-hand column above, the surface finish of a die is constant and the type of polymer under extrusion as well as its extrusion temperature, viscosity and skin friction are known or determinable constants and are related. This leaves the variables of extrusion pressure, die pressure drop and die clearance to be determined with a given polymer. The extrusion pressure is determinable following establishing of the pressure drop and die clearance in the die, the latter two factors being related. The die of the present invention must be designed to provide for equal pressure drops along all portions of the total die clearances in order to establish uniform plastic flow and permit equal time rate of flow of the plastic material in the die during the sheet forming operation. A typical example of suitable die clearance dimensions for the die plates 16 and 17 described above is as follows:

For the purpose of forming a continuous sheet of polyvinylidene chloride having a width of 10 inches and a maximum thickness of about 0.01 inch, the material delivery passageway 18 is in communication with the slot 20 through the combined groove portions 26–28 and 43–45. The combined grooved portions 26–28 and 43–45 are approximately 10 inches in length. Similarly, the length of the slot 20 including the die gap 21 is 10 inches. That portion of the passageway 18 defined by the combined grooves 26–28 and 43–45 extends at an angle of 9° to the longitudinal axis of the die and the larger portion defined by the combined grooves 26 and 43 has a diameter of ¼ inch. The length of this portion is 6½ inches from which point the combined groove portions 27 and 44 define a passageway having a diameter of 3/16 inch and a length of 1½ inches. The end portion of the passageway defined by the combined grooves 28 and 45 has a diameter of ⅛ inch and extends for 2 inches. The recessed area 30 of the die plate 17 which defines the slot 20 is 0.02 inch deep and decreases in width from approximately 1½ inches to 0 inch at the end of the passageway 18. The die gap 21 provides a clearance of 0.01 inch and the land 31 has a width of about ⅛ inch.

Polyvinylidene chloride film having an approximate composition of 85% vinylidene chloride and 15% vinyl chloride has been efficiently formed by use of a die having the above listed dimensions. In arriving at these dimensions, it was necessary to determine and relate the variable factors listed above. The die parts used were formed from Duranickel having the following analysis:

| | Percent |
|---|---|
| Nickel (including small amounts of cobalt) | 93.7 |
| Aluminum | 4.4 |
| Silicon | 0.5 |
| Iron | 0.35 |
| Manganese | 0.3 |
| Carbon | 0.17 |
| Copper | 0.05 |
| Sulfur | 0.005 |

The particular polymer to be extruded (85–15 polyvinylidene chloride) was considered from the standpoint of extrusion temperature and its viscosity at this temperature. It was determined that extrusion should occur under a temperature of about 180° C. at which temperature the viscosity would be about 15,000 to 20,000 poises. These known factors eliminated all of the related constants except for skin friction which for a given polymer under the conditions specified is the equivalent of the pressure drop required to provide plastic flow through given die clearances. Consequently, the pressure drop was plotted against varying die clearances with the resulting curve illustrated in FIG. 11. It will be noted that the relationship of pressure ranging upwardly to above 100 p.s.i. and die clearances ranging from 0.01 to 0.21 inch provides a relatively flat curve at larger die clearances with a sharp rise in pressure drop in smaller die clearances.

In using a material delivery passageway 18 having an effective sheet forming length of 10 inches in order to form a sheet having a width of 10 inches, the pressure drop along the passageway 18 was determined to be 12 p.s.i. per inch. The total drop was 120 p.s.i. and in order to provide for improved uniform flow of all portions of the plastic material within the die during extrusion thereof, it was necessary to provide the triangular slot 20 with a clearance which would provide for uniform spreading and flow of the plastic material throughout the entire area thereof. In order to bring this about the clearance of the slot 20 must be adequate to establish a pressure drop in any part thereof which in summation with the pressure drop at a point in the passageway 18 from which a given portion of material is delivered into the slot is equal to the total pressure drop of 120 p.s.i. In taking the point of maximum width of the slot 18 which was determined to be 1.44 inches, a total pressure drop of 120 p.s.i. was divided by 1.44 inches and the resultant 83.3 constitutes the pressure drop per inch required for a uniform flow in this portion of the die. Reference to the graph of FIG. 11 at a value of 83.3 on the pressure side indicated the need for a slot clearance of 0.022 to 0.023 inch. The provision of this clearance in the slot throughout the entire sheet forming area in combination with the given pressure drop in the passageway 18 provided for virtually constant and equal extrusion time rate of flow of any given portion of the plastic material through the extruder die upon entry thereof into the material delivery passageway 18 to any point along the terminus of the slot 20 along the extrusion face of the die and through any portion of the passageway 18 and slot 20. Uniform flow of this type being virtually constant to an extent of substantial improvement over the operation of known dies prevents stagnation and resulting decomposition of the heat-sensitive plastic material.

In completing the calculations necessary for efficient operation of the extruder die, the total pressure required in delivering the heated plastic material into the die was computed as follows. That portion of the material delivery passageway defined by the combined grooves 25 and 42 has a length of 2 inches which when added to the 10 inches of the angled portions of the passageway provides a feed channel having a total length of 12 inches and pressure drop of 12 p.s.i. per inch. This total of 144 p.s.i. is added to the total pressure drop of the slot 20 which is calculated by multiplying the total 7.2 square inches of slot clearance by the required 83.3 pounds pressure drop required per inch. Thus, 600 p.s.i. plus 144 p.s.i. gives a total pressure requirement at the die entrance of 744 p.s.i. To this amount should be added the pressure created by the ⅛ inch wide die gap 21 extending along the extrusion face of the die. The ⅛ inch wide die gap or orifice has a clearance of 0.01 inch to control the final thickness of the film. An extension of the curve of FIG. 11 would establish a pressure drop of approximately 150 p.s.i. at a clearance of 0.01 inch. This pressure drop when multiplied by the total die gap area of 1.25 square inches would amount to approximately an additional 190 to 200 pounds pressure which must be added to the total required pressure of 744 p.s.i. at the die entrance.

While specific information has been given above in connection with a 10 inch extruder die, it will be understood that sheets of different widths may be formed by slight variations in the dimensions of the die. For example, assuming that a 12 inch sheet were desired, the passageway 18 would be angled at less than 90° and the clearance in the slot 20 would be decreased to maintain the same time lapse between the radial distances and the horizontal distances of flow. Should an 8 inch sheet be desired, the total die plate length could be shortened and the angle of the passageway 18 would be greater than 9° with the slot clearance being greater than 0.02 inch to provide for equal plastic flow time through the sheet forming slot 20 and the shortened material delivery passageway 18.

FIGS. 7-10 illustrate the top and bottom die plates 60 and 61, respectively, which are of modified design but which incorporate the principles of the present invention. The extruder die 15 described above is designed for end feeding while the die formed by combining the plates 60 and 61 is designed for center feeding. Furthermore, the die formed by combining the plates 60 and 61 is capable of extruding a film of substantial width as on the order of 15 inches. While the plates 60 and 61 illustrate center feeding, it will be understood that end feeding may be used if desired. The description of the plates 60 and 61 will not be as detailed as that in connection with the plates 16 and 17 as the operational features are identical with relatively minor changes being made in the configuration of the material delivery passageway and sheet forming slot to accommodate the substantially increased sheet width.

Each of the surfaces of the plates 60 and 61 designed for combining in forming an assembled extruder die are provided with communicating channel-shaped grooves which provide a feed portion 62, a branch pair of first delivery portions 63, a second pair of delivery portions 64 which are of reduced radii, and a third pair of delivery portions 65 which are of even smaller radii. The grooved portions of each plate are combined in the manner previously described to define a generally Y-shaped material delivery passageway which branches off in angular forked relation laterally from the central feed portion defined by the combined grooves 62. The area radially adjacent the branched grooves of the plate 61 is provided with a triangular recess 66 which defines the sheet forming area or slot of the type previously described. The terminus of this area is a land 67 extending along the extrusion face of the die plate 61 and defining with the combined face of the die place 60 a die gap of the type previously described when the plates 60 and 61 are assembled.

The top plate 60 is provided with a conduit receiving opening 68 into which heating fluid is delivered through the die plate to a series of interconnected passageways 70, 71, 72, 73 and 74. The passageway 74 opens on the die cavity face of the plate 60 and is countersunk while receiving therein a sealing gasket 75 for sealing around a passageway 76 formed in the cavity face of the plate 61 to deliver heating fluid from the plate 60 into the plate 61, or vice versa. The opening 76 is in communication with the plurality of internal passageways 77, 78, 80 and 81 extending throughout the bottom plate 61 to circulate the heating fluid. A conduit connection is made in the tapped opening 82 of the bottom plate 61 for discharge of the heating fluid from the assembled die or for delivery of the heating fluid thereto as the case may be. The plates are each provided with a plurality of vertically directed tapped holes 83 through which threaded bolts are received in interconnecting the plates in assembled relation. The bottom plate 61 carries a pair of spaced, vertically directed dowel pins 84 which are received in openings 85 in the top plate for plate alignment purposes.

Plastic material is delivered into the feed channel portion defined by the combined groove portions 62 of the plates 60 and 61, is fed into both branches or forks of the material delivery passageway, and spread laterally outwardly therefrom through the sheet forming slot defined by the recess 66. The sheet forming operation is carried out in the same manner as previously described in connection with the operation of the extruder die 15 with the only difference residing in the fact that the sheet formed is of much greater width. In determining the dimensions of the various parts of the die cavity, the same general procedure is followed as explained above in connection with the extruder die 15.

While the portions of reduced diameter of the material delivery passageway in each of the forms of extruder dies have been illustrated and described as distinctly defined areas, it will be understood that the material delivery passageway of each die may be continuously tapered to provide the desired results without resorting to the step-wise design referred to. The step-wise design may be preferred from the standpoint of ease of machining but as long as the overall taper in the material delivery passageway is retained, the manner of obtaining such taper is not critical. With the formation of thicker films or with the designing of the die to utilize very small slot clearances, the die gap described in connection with each type of die disclosed is not essential. In certain instances it is desirable to eliminate the lands 31 and 67 defining the gap and this may be readily done without materially affecting the operation of the die providing proper final film thickness is obtained.

Obviously certain modifications and variations of the invention as hereinbefore set forth may be made without departing from the spirit and scope thereof, and therefore only such limitations should be imposed as are indicated in the appended claims.

I claim:

1. An extruder die for use in forming a continuous sheet of film from thermoplastic material, said die comprising a generally circular internal material delivery passageway closed at one end and arranged for communication at the other end thereof with material supply means, said passageway having a single longitudinal axis, and a sheet forming slot extending radially from said passageway to a face of said die, said material delivery passageway in the direction of its closed end being angled throughout its single longitudinal axis toward said face, said slot being in radially directed communication with said passageway throughout the length thereof and opening outwardly of said face, said slot being of constant depth and of diminishing width in a direction toward the closed end of said passageway.

2. An extruder die for use in forming a continuous sheet of film from thermoplastic material, said die comprising a generally circular internal material delivery passageway closed at one end and arranged for communication at the other end thereof with material supply means, said passageway having a single longitudinal axis and a sheet forming slot extending radially from said passageway to a face of said die, said material delivery passageway in the direction of its closed end being angled throughout its single longitudinal axis toward said face, said slot being in radially directed communication with said passageway throughout the length thereof and opening outwardly of said face, said slot being of constant depth and diminishing width in a direction toward the closed end of said passageway, the clearance in said slot and the diameter of said material delivery passageway being related to maintain a virtually constant rate of flow of material upon entry thereof into said material delivery passageway to any point along the terminus of said slot along said face and through any portion of said passageway and said slot.

3. An extruder die for use in forming a continuous sheet of film from thermoplastic material, said die comprising a generally circular internal material delivery passageway closed at one end arranged for communication at the other end thereof with material supply means, said passageway having a single longitudinal axis, said passageway being of decreasing diameter in a direction toward the closed end thereof, and a sheet forming slot extending radially from said passageway to a face of said die, said material delivery passageway in the direction of its closed end being angled throughout its single longitudinal axis toward said face, said slot being in radially directed communication with said passageway throughout the length thereof and opening outwardly of said face, said slot being of constant depth and diminishing width in a direction toward the closed end of said passageway, the effective material flow area of said slot and said material delivery passageway being related to maintain a virtually constant and equal extrusion time rate of flow of material upon entry thereof into said material delivery passageway to any point along the terminus of said slot and along said face and through any portion of said passageway and said slot.

4. An extruder die for use in forming a continuous sheet of film from thermoplastic material, said die comprising interconnected plates each of which in combined surfaces thereof is provided with a semi-circular groove, said groove being combined to define a circular internal material delivery passageway closed at one end thereof and arranged for communication at the other end thereof with material supply means, said passageway having a single longitudinal axis, and a triangularly shaped, relatively shallow recessed area in the surface of one of said plates, said area being in communication with said passageway throughout an entire longitudinal margin thereof while further opening outwardly of an outer face of said die, said passageway being angled toward said outer face in the direction of its closed end.

5. An extruder die for use in forming a continuous sheet of film from thermoplastic material, said die comprising a generally circular forked internal material delivery passageway extending in generally Y outline and closed at the outer ends of the forks thereof and arranged for communication at the remaining end thereof with material supply means, each of said forks having a single longitudinal axis, the forks of the passageway being of decreasing diameters in a direction towards the closed ends thereof, and a sheet forming slot extending from and between said forks to a face of said die, said slot being in radially directed communication with said forks throughout the lengths thereof and being of uniform depth while opening outwardly of said face, the clearance in said slot and the diameters of said forks being related to maintain a virtually constant and equal extrusion time rate of flow of material upon entry thereof into said material delivery passageway to any point along the terminus of said slot and along said face and through any portion of said forks and said slot.

References Cited in the file of this patent

UNITED STATES PATENTS

| | | |
|---|---|---|
| 1,544,002 | Grove | June 30, 1925 |
| 1,990,078 | Kinsella et al. | Feb. 5, 1935 |
| 2,387,718 | Coleman | Oct. 30, 1945 |
| 2,479,804 | Bailey et al. | Aug. 23, 1949 |
| 2,923,971 | Nelson | Feb. 9, 1960 |

FOREIGN PATENTS

| | | |
|---|---|---|
| 916,623 | France | Aug. 26, 1946 |
| 167,559 | Australia | Apr. 26, 1956 |